May 6, 1941.  E. L. HARDER  2,241,127
PROTECTIVE RELAY
Filed April 14, 1938  3 Sheets-Sheet 1
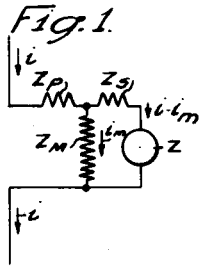
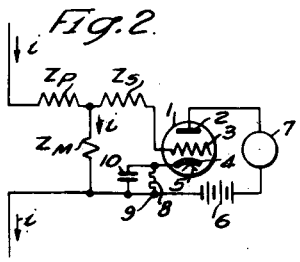
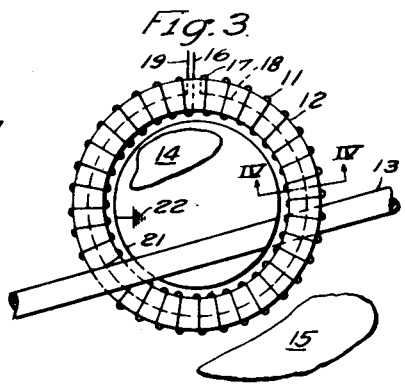
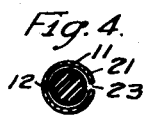
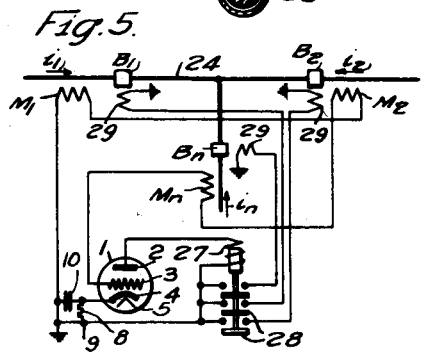
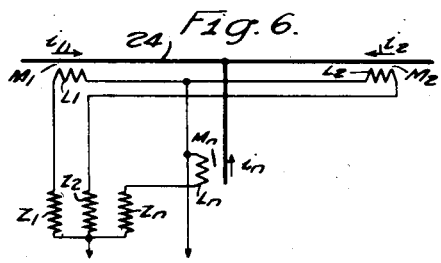
To Relay or Amplifier and Relay.
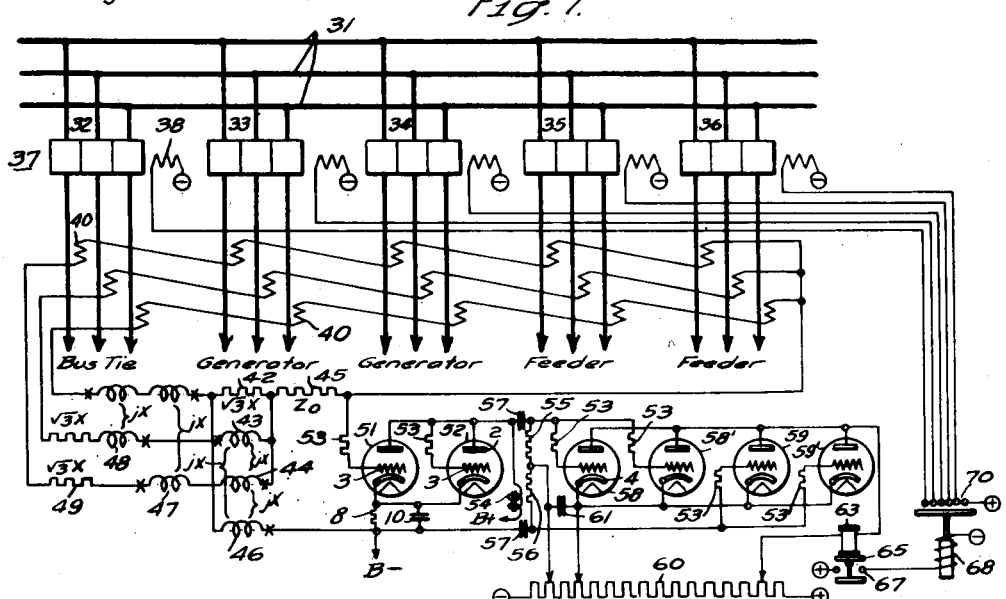
WITNESSES:
E. A. McCloskey
New. C. Groome
INVENTOR
Edwin L. Harder
BY O. B. Buchanan
ATTORNEY May 6, 1941.  E. L. HARDER  2,241,127
PROTECTIVE RELAY
Filed April 14, 1938   3 Sheets-Sheet 2
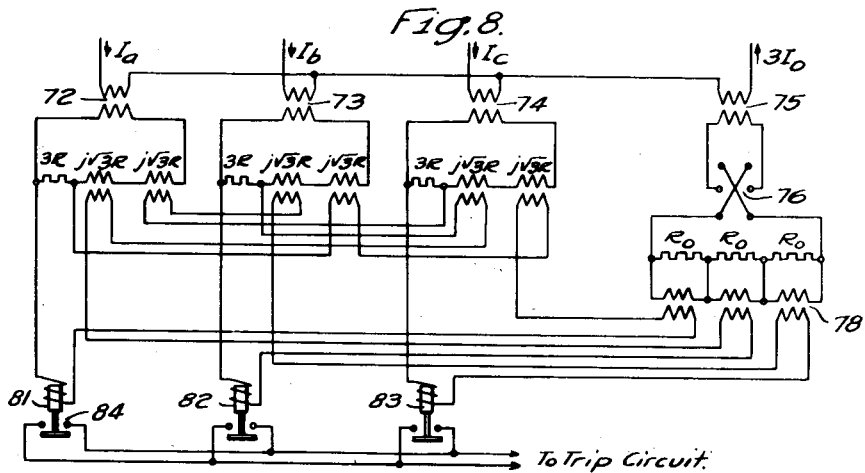
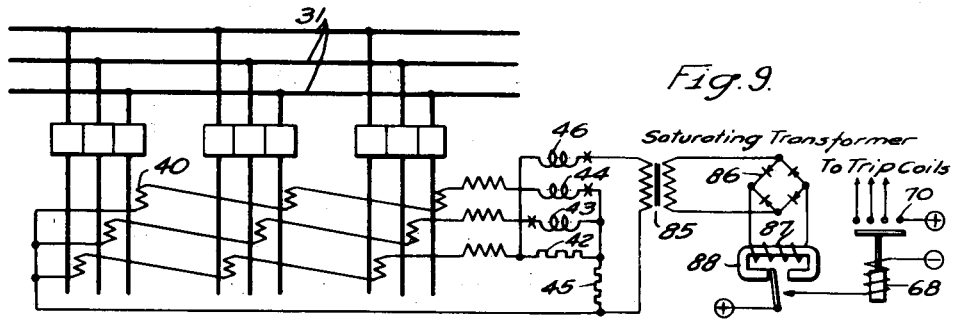
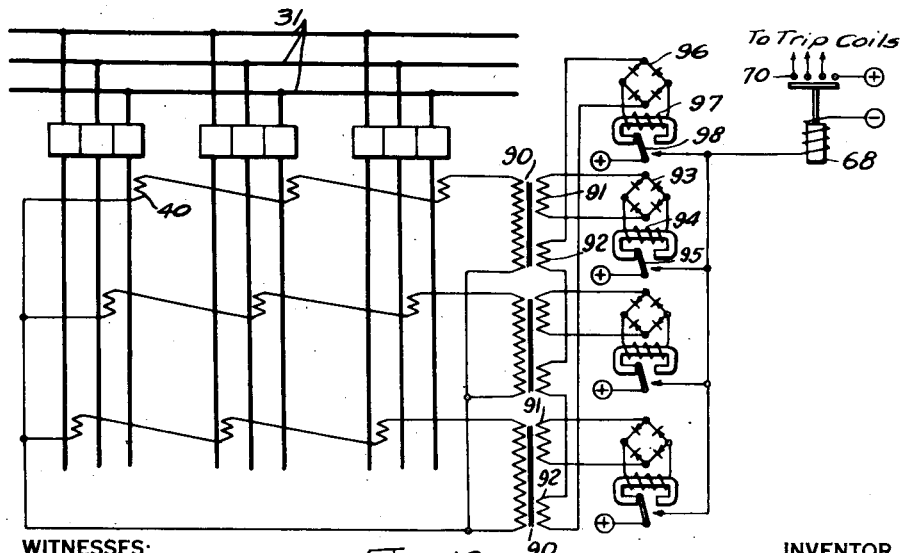
WITNESSES:
E. A. M°Closkey
Nui. C. Froome
INVENTOR
Edwin L. Harder.
BY O. B. Buchanan
ATTORNEY May 6, 1941.  E. L. HARDER  2,241,127
PROTECTIVE RELAY
Filed April 14, 1938   3 Sheets-Sheet 3
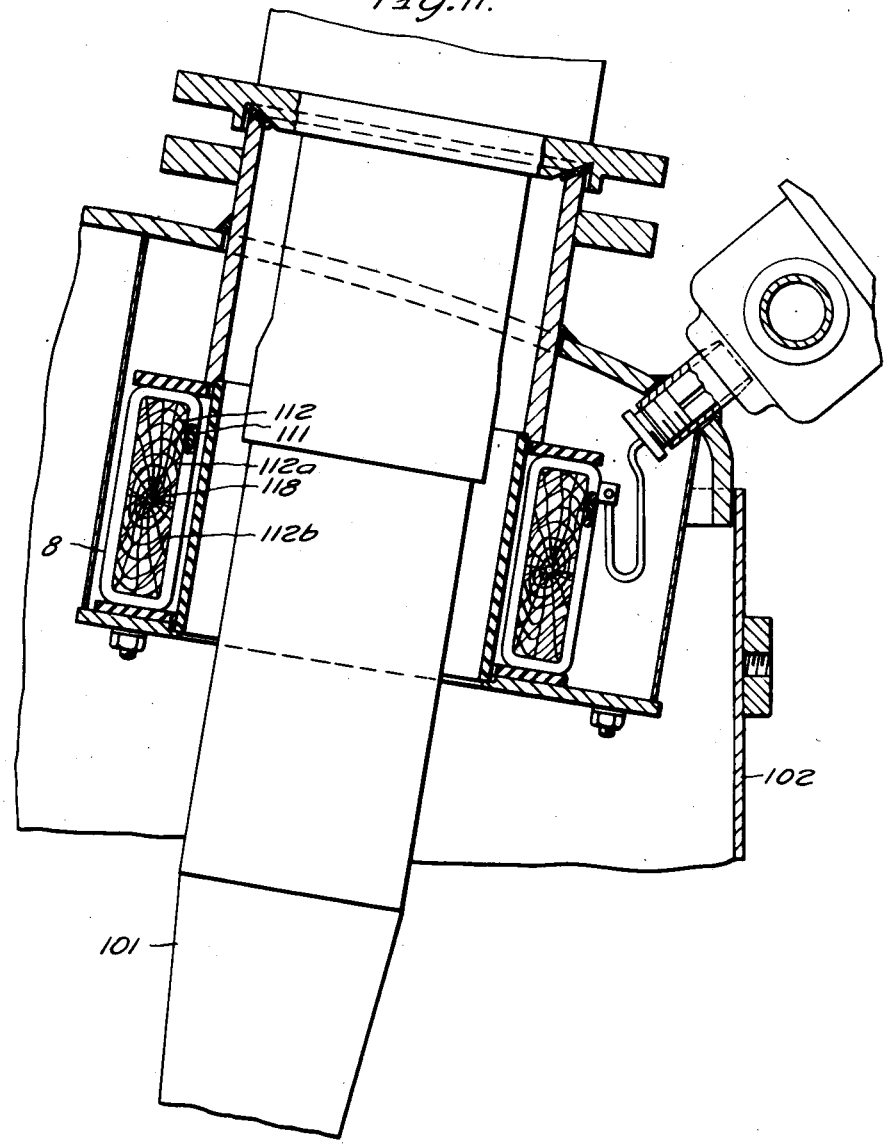
WITNESSES:
INVENTOR
Edwin L. Harder.
BY
ATTORNEY Patented May 6, 1941

2,241,127

UNITED STATES PATENT OFFICE 2,241,127

PROTECTIVE RELAY

Edwin L. Harder, Forest Hills, Pa., assignor to Westinghouse Electric & Manufacturing Company, East Pittsburgh, Pa., a corporation of Pennsylvania Application April 14, 1938, Serial No. 202,015

26 Claims. (Cl. 175—294)

My invention relates to protective relaying apparatus for protecting electrical equipment against faults, and it has particular relation to responsive apparatus for commercial electrical power-line equipment.

One object of my invention is to provide a commercially practicable differential protective relaying equipment for multi-terminal alternating-current power-apparatus of a commercial power-line frequency, said relaying equipment being generally applicable in connection with protected apparatus having any number of terminals whatsoever—with two terminals, as in the case of the differential protection of power-transformers or generators—or with a large number of terminals, as in the differential protection of power-line buses having a large number of sources, loads or bus-ties connected thereto.

A more specific object of my invention is to provide a differential protective equipment for multi-terminal alternating-current apparatus in which response is made to the instantaneous sum of the first derivatives of the current-inputs at the various terminals, integrated over the relay operating-time.

Another object of my invention is to provide a relaying system utilizing a current-responsive mutual-inductance or mutual-impedance device, in which the magnetizing current, or the mutual-circuit current in the equivalent transformer diagram, constitutes, or may constitute, practically the entire current in the mutual-impedance device, the relaying circuit drawing only a very small current with respect to said magnetizing mutual-circuit current, which is in sharp distinction from an ordinary current-transformer, in which the magnetizing currents are almost negligibly small in comparison with the currents drawn by the relaying equipment.

A more specific object of my invention is to provide a differential relaying equipment utilizing a current-responsive mutual-impedance device comprising a closed-ring core of non-magnetic material, or material of substantially constant permeability, said core being encompassed by a large number of closely wound turns of a coil, said coil being preferably wound on said closed-ring core in such manner as to be astatic so as to have substantially zero mutual inductance with reference to any circuit not passing through said core.

A further object of my invention is to provide means for energizing a current-responsive network (such as a phase-sequence network for providing predetermined selective responses to one or more of the phase-sequence components of a polyphase current), from a system of polyphase voltages, utilizing external loading impedances, in addition to said current-responsive sequence-network, for substantially equalizing the loads and power factors of the devices connected to each of said voltages.

A further object of my invention is to provide a plurality of sequence-networks and a separate relaying device for each network, the operating contacts of the relays being so arranged that a controlled circuit is affected whenever any one of said relays responds, the number of sequence-networks being the same as the number of phases of the polyphase current or voltage to which the networks respond, each network being connected so as to utilize a different one of the polyphase phases as the principal phase of reference. By connecting the corresponding phases of all of the networks in series with each other, I provide network-circuits which are responsive to either impressed currents or impressed voltages, and by connecting the relay-contacts so that a controlled circuit is responsive to any one of the relays, I provide a relaying system which is equally responsive to single-phase faults on any one of the phases of a polyphase line or circuit. If desired, this combination-network may be utilized with less than all of the individual sequence networks associated with relays, and the omitted relays can be replaced with dummy impedances.

A still further object of my invention is to provide an improved differential relaying system for multi-terminal polyphase apparatus, utilizing separately adjustable phase and ground-fault relays.

With the foregoing and other objects in view, my invention consists in the apparatus, combinations, circuits and systems hereinafter described and claimed, and illustrated in the accompanying drawings, wherein:

Figures 1 and 2 are equivalent transformer-circuit diagrams illustrating the essential difference between my mutual-reactance device and an ordinary current-transformer;

Figure 3 is a diagrammatic view illustrative of the construction of my toroidal mutual-impedance device for responding to the first derivative of the current in a conductor;

Fig. 4 is a sectional view on the line IV—IV of Fig. 3;

Fig. 5 is a diagrammatic view illustrating a differential protective system for a multi-terminal bus, utilizing my mutual-impedance devices connected in series;

Fig. 6 is a similar view with the mutual-impedance devices connected in parallel;

Fig. 7 is a diagrammatic view illustrating an application of my invention to the differential protection of a multi-terminal three-phase bus, utilizing my special mutual impedance for responding to the first derivative of the terminal currents, utilizing a current-responsive sequence-network with additional serially connected impedances for obtaining a predetermined selective response to positive and zero phase-sequences, and utilizing tube-amplifiers and detectors for energizing the relaying equipment;

Fig. 8 is a diagrammatic view of circuits and apparatus illustrating the use of a plurality of serially connected phase-sequence networks each supplying its own relay;

Fig. 9 is a view similar to Fig. 6 illustrating a different type of load-device on the output circuit of the phase-sequence network;

Fig. 10 is a diagrammatic view of circuits and apparatus illustrating a differential bus-protective system utilizing separate phase and ground-fault relaying equipments; and Fig. 11 is a sectional view through the corner of a tank of a circuit breaker or other electrical apparatus, showing the structural design of a toroidal mutual-impedance device in accordance with my invention, as utilized in connection with a condenser-bushing surrounding one of the terminal-leads of the electrical apparatus.

According to one important feature of my invention, I prefer to utilize a current-responsive device which develops a voltage proportional to the first derivative of the current in a line. Another way of arriving at the same result is to say that, in the equivalent circuit of the current-transformer or mutual-impedance device which is utilized to derive this voltage, practically all of the primary current is, or may be, consumed in the magnetizing-current branch of the equivalent circuit, without producing an impedance-change in said branch, while only a relatively small current (if any) flows through the secondary circuit, the magnetizing branch having a substantially linear volt-ampere characteristic for all current-values therein up to the maximum primary current.

The foregoing general principles will best be understood by reference to Fig. 1, which shows the familiar equivalent-circuit diagram for a conventional iron-core current-transformer having a primary current $i$, a magnetizing current $i_m$, and a secondary current $i-i_m$. The transformer has primary and secondary leakage impedances $Z_P$ and $Z_S$, and a mutual impedance $Z_M$. The impedance of the secondary load-circuit is represented by $Z$.

In an ordinary current-transformer, the mutual impedance $Z_M$ is made quite large, so that the mutual-impedance current or magnetizing current $i_m$ is relatively small, and since it is small its wave-shape is of little importance. The result of this proportioning is to make the secondary current $i-i_m$ substantially equal to the primary current $i$ multiplied by the current-ratio or transformation-ratio of the transformer. It is a fact well-known to relaying experts that such a transformer does not produce an output which is at all times proportional to the first derivative of the primary current. In the first place, the output is a current rather than a voltage. Also trouble usually comes from transients which are accompanied by a direct-current component in the primary circuit, or from other causes producing superimposed direct and alternating currents in the primary circuit.

When direct current suddenly begins to flow in the primary circuit of a current-transformer such as is represented in Fig. 1, only a small part of the direct current initially flows through the mutual-impedance branch $Z_M$. During the course of time, however, the direct-current component continues to flow through the mutual-impedance branch, gradually building up the direct-current strength in that branch, and sometimes requiring as much as several seconds before all of this direct-current component is flowing through the mutual-impedance branch. During this time, the secondary current decreases to zero, as the full primary direct current becomes exciting. It will readily be seen, therefore, that such a current-transformer by no means responds to the first derivative of the primary current, which was assumed to have had a sudden direct-current increment some seconds previously. In addition to all of the foregoing, the direct-current component would saturate the transformer-iron, which has heretofore been universally utilized, causing large changes in the value of the mutual impedance $Z_M$ and in the other impedances $Z_P$ and $Z_S$.

In accordance with one aspect of my invention, as indicated by the equivalent diagram in Fig. 2, I utilize a mutual coupling device in which the mutual impedance $Z_M$ is smaller than in a conventional iron-core current-transformer and is above all substantially constant for all values of the magnetizing current $i_m$ within the operating range of the device. In the operation of this transformer, it is possible to use the transformer so that practically no secondary current is drawn through the secondary leakage impedance $Z_S$ and the load-circuit impedance $Z$. This may be accomplished, for example, by utilizing a secondary load-device or voltage-responsive device which draws substantially no current, such as a class-A amplifier-tube 1. In such a transformer, the primary current $i$ passes, or may pass, in practically its full strength, through the mutual-impedance or magnetizing-circuit branch $Z_M$. When a direct-current component suddenly appears in the primary circuit, that same component necessarily immediately appears full-strength in the internal magnetizing-circuit branch $Z_M$ of my coupling-transformer, so that the voltage-drop in this internal magnetizing-circuit impedance $Z_M$ produces a measurable internal voltage drop which necessarily responds to the rate of change (or the first derivative) of the primary current $i$.

A class-A amplifier-tube, as is well known in the art, is a tube which responds to the voltage-changes in its grid, drawing substantially no grid-current. The particular tube 1 shown in Fig. 2 comprises an anode 2, a grid 3 and a cathode 4, which is indirectly heated by a heater or filament 5. The tube derives its energy from a direct-current source such as a battery 6, which is connected in circuit between the cathode 4 and the anode or plate 2, in series with a load-device which may be a relay 7, and in series also with a small series resistor 8 which is connected at the cathode end of this circuit.

The grid 3 in Fig. 2 is, or may be, biased negatively with respect to the cathode 4, by reason of the voltage-drop caused by the flow of the plate-circuit current (in 6 and 7) through the biasing resistance 8. This is brought about by having the free terminal 9 of the resistance 8, that is, the terminal which is not connected to the cathode 4, connected to one terminal of the input-circuit of the tube 1, the other input terminal being connected to the grid 3. In the particular circuit shown in Fig. 2, this tube-input circuit comprises the impedances $Z_M$ and $Z_S$, thus providing a direct, low-impedance circuit for establishing the direct-current biasing-potential of the grid 3. In accordance with a well-known connection, the biasing resistance 8 is ordinarily bypassed by a capacitor 10 for providing a low-impedance path for the alternating-current component of the input into the tube 1.

In order to achieve a mutual-impedance device having the characteristics which have been described in connection with Fig. 2, I prefer to utilize an air-core or non-magnetic-core coupling, in order to entirely eliminate the effects of saturation, making the derived secondary quantities strictly and theoretically linear with respect to the primary quantities. I also prefer to utilize a special so-called astatic toroidal type of "air-core" (or non-magnetic) coupling which is unaffected, either by neighboring members of magnetic material, or by any flux other than that which flows around the toroid.

Referring to Fig. 3, a toroidal coil 11 is wound, with turns close together, on a toroid 12 of non-magnetic non-conducting material. This toroid is linked one or more times by a power-conductor 13, which is a part of an electrical circuit, the return-path of this electrical circuit being anywhere outside of the toroid 12. Since the turns of the winding or coil 11 are close together, the effect is approximately that of a sheet-winding.

If current is passed through the secondary winding 11, with the primary circuit 13 open-circuited, a sheet of current is formed about the toroidal form 12, producing a toroid or doughnut of flux. This flux runs around in an endless circuit through the toroid, entirely within the confines of this sheet of current produced by the coil 11. Under such circumstances, no magnetomotive force will be measurable or observable anywhere outside of the toroid 12, either in the hole within the ring of the toroid, as symbolized by the body 14, or in any of the space outside of the outer circumference of the toroid, as symbolized by the body 15. Hence it is quite immaterial what fluxes are carried by any of these bodies 14 or 15 outside of the actual body-portion of the toroid 12, and these external bodies 14 and 15 may be of magnetizable material, without being in the least affected by the circular flux flowing through the toroid 12.

The effect of a circular flux flowing around the toroid 12 which encircles the primary conductor 13 is to tend to induce a current in said primary conductor 13, which effect will appear as a voltage induced in the primary conductor 13, if the latter is open-circuited and current is caused to flow through the secondary coil 11, as previously assumed.

The mutual-inductance between the secondary winding 11 and the primary winding 13 is substantially $$M = n_p n_s P \qquad (1)$$

where $n_p$ is the total number of primary turns or inter-linkages with the toroid, $n_s$ is the number of secondary turns per unit-length of the toroid, and P is the permeance of the flux-path of the toroid, per unit-length, expressed in henrys. The self-inductance of the secondary winding 11 is substantially $$L = n_s^2 l P \qquad (2)$$

where $l$ is the circumferential length of the toroid.

The voltage induced in the primary conductor 13, as a result of current $i_s$ in the secondary winding 11, is $$e_p = M \frac{di_s}{dt} \qquad (3)$$

According to the theorem stating the reciprocity of mutual inductances, it follows that, if the secondary winding 11 is open-circuited and a current $i_p$ flows in the primary winding 13, the voltage induced in the secondary winding is $$e_s = M \frac{di_p}{dt} \qquad (4)$$

where M is a fixed, definite, non-saturating, and easily calculated value given by Equation 1.

It is very desirable that the conductor of the secondary coil or winding 11 should be wound non-inductively with respect to any flux flowing through the hole of the toroid 12, that is, with respect to any flux flowing longitudinally with respect to the primary conductor 13. In other words, the coil 11 should not constitute, in effect, a one-turn loop running circumferentially around the toroid 12. Thus, if the coil 11 starts at 16 in Fig. 3, and is wound around the toroid 12, progressing in a counter-clockwise direction up to the point 17 which is close to the entrance-point 16, it will be observed that the coil has thus far formed a one-turn loop around the conductor 13, or a one-turn loop wound circumferentially around the toroid 12. In order to make such a winding 11 non-inductive with respect to the toroid 12, it is necessary to bring the winding back in a clockwise direction, back to its starting point at 16, which may be done either by winding a second layer over the first layer of turns 11, or by bringing the return-conductor back through the center of the toroid 12, as indicated at 18, bringing the finishing terminal 19 of the coil back in a clockwise direction to a place adjacent the starting point 16.

If desired, the electrostatically induced potential of the secondary coil 11 may be limited by means of an internal cylindrical shield 21, which may be grounded at 22, and which is disposed around the hole of the toroid, as indicated in Fig. 3. This will guard the coil 11 against electrostatically induced potentials, in case the primary conductor 13 is at a high potential. This grounded shield 21 must not, of course, form a short-circuited turn around the toroidal flux-path 12, and to this end the shield 21 is split, as indicated at 23 in Fig. 4.

In actual practice, the toroidal magnetic path 12 may be stretched out to a considerable length, in order to be spaced at a great radial distance from a high-voltage conductor 13, the radial spacing being great enough to permit the use of air as insulation between the two.

In the foregoing description, I have referred to the non-magnetic core 12 as being toroidal in shape. It should be understood that the word "toroid" or "toroidal" is used here in its strict sense of a toroid of revolution, which gives actually and theoretically perfect results or linearity of response to the first derivative of the primary current, unaffected by extraneous fluxes, and the same response irrespective of the location of the primary conductor within the toroid or of the return-path of the primary circuit outside of the toroid. In a more general sense, however, I may utilize a closed ring of any shape, whether its internal and external peripheries are circular or not, and regardless of its cross-sectional shape, provided that the above-described effects of a perfect toroid are approached with a sufficient approximation for practical purposes. The shape of the core 12 may depart materially from a toroid of revolution, provided that the rate of change of the radius of curvature is kept small (avoiding square corners, for example), so that the flux due to the current in the coil shall be almost entirely within the ring-like sheet of current formed by the winding. When I utilize expressions such as "closed ring" or "toroid," I desire them to be understood, therefore, with these explanations in mind.

The cross-section of the magnetic path of the circular flux in the closed ring 12 may theoretically be very small. In case two or more mutual-impedance devices such as that which is shown in Fig. 3 are utilized, to respond to currents in two or more terminals of a differentially protected multi-terminal electrical apparatus, it may be desirable to match the mutual impedance of one coupling-device with that of the other or others, and in such a case, it would be practically desirable for the cross-section of each of the closed rings or toroids 12 (which controls the unit-length permeance P) to be large enough so that the cross-section of one could be matched against the cross-section of another without requiring too close tolerances in the manufacturing operations. Thus, with a cross-section of 1 square inch, a discrepancy of one thousandth of an inch in the dimensions of the cross-section might be unimportant, whereas, if the cross-section were one hundredth of a square inch, an error of one thousandth of an inch in the diameter or side of the cross-section might be more serious.

At ordinary commercial power-line frequencies, such as 60 cycles, there is practically no limitation as to the circumferential length of the magnetic path comprised by the closed ring or toroid. The only theoretical limit to the length of this magnetic path is the capacity between the turns of the winding 11, an effect which is negligible in any reasonable design at 60 cycles.

It is an important feature of my invention that the mutual impedance or coupling-ratio M shall be fixed or unchangeable under all operating-conditions. This mutual impedance is the product of the unit-length turns $n_s$ and the unit-length permeance P. The secondary turns $n_s$ per unit circumferential length of the toroid are fixed by the design. The unit-length permeance P is dependent upon the cross-section of the toroid and the permeability of the material of the toroid. The cross-section is fixed by the design, and is more readily predeterminable, in designing the mutual-impedance device and building it to specifications, if but a single layer of secondary turns are wound on the toroidal core, although this limitation is not obligatory. The permeability of the material of the toroid must be substantially constant or the same for all values of the current, and this constancy is most readily obtainable by utilizing a so-called non-magnetic material.

According to one aspect of my invention, I make use of the fundamental principle that, unless there is a fault on a bus or other multi-terminal electrical apparatus to be protected, the sum of the rates of change of the current flowing into the apparatus at its different terminals totals zero. If the currents at the various terminals are distinguished by subscripts, as $i_1, i_2, \ldots i_n$, then this fault-free relationship may be empressed by the differential equation $$\frac{di_1}{dt}+\frac{di_2}{dt}+ \ldots +\frac{di_n}{dt}=0 \quad \text{(5)}$$

This principle is made use of, in my invention, rather than the customary principle of balancing the currents themselves, as expressed by the current-equation $$i_1+i_2+ \ldots +i_n=0 \quad \text{(6)}$$

because the differential-Equation 5 can be obtained in the secondary circuit of a current-transformer or mutual-impedance device, without encountering difficulties by reason of time-constants or direct-current components, as have been explained in connection with Figs. 1 and 2.

Fig. 5 represents one form of embodiment of my invention as applied, by way of illustration, to a multi-terminal bus 24 having a plurality of terminals, each protected by a circuit-breaker $B_1, B_2, \ldots B_n$. Derivatives of the primary currents $i_1, i_2, \ldots i_n$ entering the bus at the respective terminals are obtained by mutual-impedance devices $M_1, M_2, \ldots M_n$, as previously described. In the Fig. 5 installation, it is assumed that the mutual impedances or turn-ratios of the mutual-impedance devices $M_1, M_2, \ldots M_n$ are all equal, which would mean, for example, that the various closed rings or toroids are all of the same cross-section, and that the numbers of turns per unit-length are all the same, the actual lengths of the toroids being immaterial. Since the mutual impedances or coupling-ratios are all identical, it is feasible to add the secondary or output-voltages by connecting them in series, the sum of these voltages being normally zero, as expressed in Equation 5.

In Fig. 5 the sum of the secondary voltages of the mutual-impedane devices $M_1, M_2, \ldots M_n$ is illustrated as being applied to a class-A amplifier-tube 1, such as has been described in connection with Fig. 2; although it might equally well have been applied directly to a relay, provided that enough energy was available without the amplifier. The output-circuit of the amplifier-tube 1 is fed into the operating coil 27 of an electromagnetic contactor or relay, having a plurality of contact-members 28, which energize the trip-coils 29 of the respective circuit-breakers $B_1, B_2, \ldots B_n$.

In Fig. 6, a similar multi-terminal bus 24 is protected by connecting the output or secondary circuits of the various mutual-impedance devices $M_1, M_2, \ldots M_n$ in parallel, rather than in series. In this case, it is still assumed that the mutual impedances are matched, which ordinarily means that the number of secondary turns per unit-length ($n_s$) are all the same; but it may be that the total circumferential lengths $l$ of the various closed rings or toroids may not all be the same, so that the total numbers of secondary turns ($ln_s$) may not be identical, in which case the secondary self-inductances $L_1, L_2, \ldots L_n$ would not be identical.

Any dissimilarity in the secondary inductances may be matched, as shown in Fig. 6, by adding one or more series impedances $Z_1, Z_2, \ldots Z_n$ to the respective secondary circuits of the mutual-impedance devices; and the relaying device (either with or without an amplifier-tube 1) may be connected in parallel connection, as indicated in Fig. 6. In this case, the voltage which is impressed upon the relay is equal to the average of the output-voltages of the various mutual-impedance devices $M_1$, $M_2$, ... $M_n$, and this average is proportional to the sum of said voltages, as indicated by the following equation $$e = \frac{M}{n}\left(\frac{di_1}{dt} + \frac{di_2}{dt} + \ldots + \frac{di_n}{dt}\right) \quad \text{(7)}$$

In the Fig. 6 embodiment, it will be noted that the serially added impedances $Z_1$, $Z_2$, ... $Z_n$ are for balancing the self-inductances $L_1$, $L_2$, ... $L_n$ and the several resistances (not shown) of the mutual-impedance devices $M_1$, $M_2$, ... $M_n$, thus equalizing the impedances of the secondary output-circuits of the various mutual-impedance devices $M_1$, $M_2$, ... $M_n$, so that there will be no discrepancy in the "regulation" of each of these mutual-impedance devices; that is, each of the output-voltages will vary, in a similar manner, in dependence upon the load-current drawn from the secondary output-circuit by the relaying device or apparatus.

From a comparison of Figs. 5 and 6, it will be seen that the series connection of the mutual impedance devices (in Fig. 5) is a better or more natural means of summating the derivatives, as expressed in Equation 5, than the parallel connection (shown in Fig. 6), which requires very careful matching of secondary impedances. This easy or natural use of the series connection constitutes a rather fundamental difference between my response to the summed rates of change, as expressed in Equation 5, and the previously utilized response to summed currents, as expressed in Equation 6, the latter usually requiring a parallel connection of the current-transformers.

In Fig. 7, I illustrate an application of my invention to the differential protection of a polyphase multi-terminal apparatus such as a polyphase bus 31, having a plurality of polyphase terminals such as a polyphase bus-tie 32, two polyphase generator-terminals 33 and 34, and two polyphase feeder terminals 35 and 36, each terminal being provided with its own circuit-breaker 37 having a trip-coil 38. A three-phase bus is illustrated, and each of the three phase-conductors of each terminal is provided with its own mutual-impedance device 40 in accordance with the principles hereinabove described.

In accordance with the principles of my invention, each phase is treated separately, to the extent that the derivatives of the currents entering that phase at all of the terminals are totalized, as by connecting the corresponding mutual-impedance devices 40 in series. The result of the totalization of the current-derivatives in the three phases is a three-phase system of voltages which may be utilized in any desired manner, in the differential protection of the three-phase multi-terminal device represented by the bus 31 in Fig. 7.

Fig. 7 illustrates one very desirable method of utilizing the three-phase system of derived voltages, by securing a selective phase-sequence response in accordance with the equation $$e_m = I_1 \pm kI_0 \quad \text{(8)}$$

where $e_m$ is the internal voltage-response of the network, or open-circuit output-voltage of the network, and $I_1$ and $I_0$ are the positive and zero phase-sequence components, respectively, of a set of three-phase currents.

In my copending application, Serial No. 183,044, filed January 3, 1938, Patent No. 2,183,646, granted December 19, 1939, I show current-responsive networks for selectively responding to the positive and zero phase-sequence currents $I_1$ and $I_0$, by measuring voltage-drops across various impedances connected in the several phases and in the neutral return-circuit of a system of three-phase currents. One form of embodiment of such a network consists in passing one phase of the current through an impedance $\sqrt{3}X$, passing the next lagging phase of the current through an impedance $jX$, passing the third phase of current through an impedance $-jX$ (or passing it in the reverse direction through an impedance $jX$), and passing the neutral return-current $3I_0$ in either direction through an impedance $Z_0$.

In Fig. 7, I show means for energizing such a current-responsive network from a system of three-phase voltages such as are obtained by summating the outputs of the mutual-impedance devices 40 in the various phases of the bus-terminals. As shown in Fig. 7, I utilize a resistor 42 for the impedance $\sqrt{3}X$ an inductance-coil 43 for the impedance $jX$, a reversely connected inductance-coil 44 for the impedance $-jX$, and a resistor 45 for the impedance $Z_0$, the polarities of the inductance-coils being indicated by polarity-marks in accordance with a common convention. The impedance-drops across the inductances 43 and 44 are indicated as being measured, in the output or measuring circuit of the network, by means of a coil 46 which is inductively related to the coils 43 and 44, so that the mutual inductances are the same as the self-inductances times the turn-ratio, which is assumed to be unity.

In order to convert the system of three-phase voltage-vectors into a system of three-phase current-vectors such as are necessary to energize the phase-sequence measuring circuit 45—42—46, I connect various mutual impedances 47, 48 and resistors 49, in series with the several network-impedances 42, 43 and 44, in such manner that the total impedance in each phase shall be identical, both in scalar value, and in power factor or phase-angle, so that polyphase currents are obtained, which are strictly proportional to the system of polyphase voltage-vectors.

In Fig. 7, if no current is drawn from the output or measuring circuit 45—42—46 of the phase-sequence network, it can be shown that the voltage which appears in the measuring circuit will satisfy Equation 8, as set forth in my aforesaid copending application. Ordinarily, that is, when there is no fault on the polyphase bus 31, the summation of voltages will be zero, so that the voltages and currents in the phase-sequence network will be zero. If any one of the ten different kinds of fault occurs on the three-phase bus 31, the summated voltages will not be zero, and a system of polyphase voltage-vectors will be applied to the network-impedances 42—43—44, and to the balancing external impedances 47, 48 and 49, producing a corresponding system of current-vectors in the network-impedances 42, 43 and 44, and corresponding neutral currents in the network-impedance 45, causing a selective phase-sequence response as defined in Equation 8.

In Fig. 7, the measuring-circuit voltage which I derive from the impedances 45, 42 and 46 is applied to two class-A amplifier-tubes 51 and 52, which are arranged in duplicate in order to afford a greater factor of safety, to take care of the contingency that one of the tubes might fail. In order to balance out any dissimilarity between the two tubes, resistors 53 may be connected in series with the respective grids 3, thus eliminating any parasitic currents. The plate or "B" battery of the tubes 51 and 52, corresponding to the battery 6 of Fig. 2, is represented by the battery terminals B+ and B−, in Fig. 7, a choke coil 54 being connected in the B+ circuit in order to keep the alternating-current output of the tubes 51 and 52 out of the B-battery circuit.

The alternating-current output of the two tubes 51 and 52 in Fig. 7 is impressed upon two equal, serially connected resistors 55 and 56, direct current from the B battery being kept out of this circuit by means of serially connected capacitors 57. The voltage-drops in the respective resistors 55 and 56 are impressed upon a pair of push-pull detector-tubes 58, 59, respectively, which are energized across a potentiometer 60 in a familiar manner. If desired, a capacitor 61 may be connected from the mid-point between the resistors 55 and 56 to the cathodes 4 of the detector-tubes 58 and 59, to bypass any unbalanced portion of the alternating-current input into the tubes 58 and 59. The detector-tubes 58 and 59 may be duplicated, as indicated at 58' and 59', if desired, in order to afford greater safety against tube-failures.

In Fig. 7, the output of the detector tubes 58, 58', 59, 59' is supplied to the operating coil 63 of a relay having some sort of a time-delay means, such as a short-circuited coil or ring 65, for slightly delaying the response of the relay in order to guard against shock-excitation. The relay has contacts 67 which are utilized to energize the operating coil 68 of a large electromagnetic contactor which, in turn, energizes a plurality of contacts 70 for energizing the various trip-coils 38 of all of the circuit breakers 37 which are connected in the various terminals of the bus 31 which is being protected.

The amplifiers 51, 52 or the relay 63, or both, might be omitted, and the power applied directly to the tripping relay 68 if the volt-ampere requirement of the latter is not too great.

As pointed out in my above-mentioned copending application, the measuring-circuit voltage $e_m$ of my current-responsive sequence-network is subject to the disadvantage that its value varies somewhat, due to the relative rotation of the vectors corresponding to $I_1$ and $kI_0$ relative to each other, this being a rotation through 120° or 240° in certain cases of faults which are symmetrical with respect to different ones of the three phases of the line-currents. This means that certain faults will produce different measured-circuit responses, in the sequence-network, according to which phase is affected by the fault.

An important feature of my invention, about to be described, is to provide a means whereby this variation in response, depending upon which phase is faulted, may be eliminated.

In Fig. 8, I show means for eliminating the discrepancy just mentioned, by providing three measuring-networks for obtaining the phase-sequence response defined in Equation 8, the three networks being dependent upon different ones of the three current-phases for the principal phase of the network-response.

Thus, referring to Fig. 8, the line-currents are indicated by $I_a$, $I_b$ and $I_c$ and by the neutral current $3I_0$. These currents are fed, respectively, into current-transformers 72, 73, 74 and 75 which may be of conventional design if no time-constants or direct-current components are to be provided for, or they may be specially constructed as hereinabove explained. The secondary circuit of the various "phase" current-transformers 72, 73 and 74 are all equally loaded by impedances $3R$, $j\sqrt{3R}$ and $j\sqrt{3R}$; and the "neutral" current-transformer 75 is fed, through a reversing switch 76, to a load consisting of three impedances $R_0$ connected in series. The impedances $j\sqrt{3R}$ are illustrated as being two-coil mutual-impedance devices.

Each of the three phase-sequence measuring-circuits in Fig. 8 is caused to measure the voltage-drop in one of the resistors $3R$, plus the voltage-drop in one of the inductances $j\sqrt{3R}$ in the next lagging phase, plus the reversely connected voltage-drop in one of the inductances of the third phase, plus the voltage-drop in one of the neutral resistors $R_0$, the latter being obtained by means of a potential transformer 78. The three measuring-circuits are utilized to energize the respective operating-coils of three relays 81, 82 and 83, the contact-members 84 of which are so connected that the operation of any one of them will energize a tripping circuit, or other circuit responsive to the actuation of the relays.

In the form of embodiment of my invention shown in Fig. 8, it will be noted that all three phases $I_a$, $I_b$ and $I_c$ are equally loaded, so that this composite network can be energized by either polyphase currents or polyphase voltages. It will further be noted that none of the energy is consumed in any inactive impedance, such as the balancing impedance devices 47, 48 and 49 of Fig. 7. It will further be noted that whatever energy is withdrawn from the measuring circuits by the various relays 81, 82 and 83 is the same on each of the three phases $I_a$, $I_b$ and $I_c$, so that no possible unbalancing of the network is obtained by reason of the withdrawn energy or the volt-ampere burden of the relays 81, 82, 83. Under these circumstances, it is easy to design the relays 81, 82 and 83 so that the maximum energy is delivered to these relays, that is, so that the impedance-drops within the relays will be equal to the corresponding impedance-drops within the network. It will be further noted that I have entirely eliminated any discrepancy in the response, resulting from faults occurring on different phases, because always the fault will occur on the favorable phase of at least one of the relays, so that tripping will be obtained, correspondingly.

The protective systems shown in Figs. 7 and 8 may, if desired, utilize calibrated relays 63, 81, 82 and 83, respectively, and these relays can be calibrated so that they will not respond to any measuring-circuit voltage which is less than that which will be obtained, under the most unfavorable conditions, for the least severe fault which might occur on the protected apparatus, thereby providing some measure of protection against imperfectly matched current-transformers or mutual-impedance devices, or, in certain instances, magnetizing-current inrushes in power-transformers (not shown).

In Fig. 9, I show a form of embodiment of my invention which is similar to that shown in Fig. 7, except that the measuring-circuit output is supplied to a saturating transformer 85, the output of which is supplied, through a rectifying bridge 86, to the coil 87 of a polarized relay 88, which is utilized to energize the electromagnetic contactor 68.

It will be noted, in connection with Fig. 9, that under all possible conditions except when there is an internal fault, the measuring-circuit voltage which is impressed upon the saturating transformer 85 will be zero. In the case of an internal fault on the protected bus or other electrical apparatus, there will be a network-response, applying the voltage to the saturating transformer 85, which is designed to saturate and limit the voltage applied to the rectifier-bridge 86, thus protecting the rectifiers against damage due to overvoltage. The output of the rectifier-bridge is supplied to the polarized relay 88 which has the property of requiring a very small input, deriving most of its energy from the permanent magnets which polarize the relay.

Fig. 10 shows another form of embodiment of my invention in a system in which, instead of utilizing a sequence-network and a single polarized relay 88, as in Fig. 9, I utilize a separate single-phase relaying equipment for each of the three line-phases and for the neutral or ground-phase, so that the four separate relays may readily be separately adjusted for operation on any desired magnitude of fault on their respective phases. As shown, the three line-phases are impressed upon the three saturating transformers 90, each of which has a secondary winding 91 and a tertiary winding 92. Each secondary winding 91 is connected, through a rectifier-bridge 93, to a relay-coil 94, which may advantageously be a polarized relay, the relay-contacts 95 of which are arranged to energize an electromagnetic contactor 68 for tripping the various breakers associated with the respective terminals of the bus 31 or other electrical device to be protected. The three tertiary windings 92 are connected in open delta, to respond to residual voltage, and are utilized to supply current, through a rectifier-bridge 96, to a relay-coil 97, having contacts 98 which are also arranged to energize the tripping contactor 68.

Fig. 11 illustrates one practical form of an air-core, or more properly a non-magnetizable core, embodiment of my invention, in connection with a high-voltage condenser-bushing 101 of an oil circuit-breaker or other electrical apparatus, represented by a tank 102. The condenser-bushing 101, at any convenient point, such as a location which has heretofore been commonly utilized for iron-core current-transformers of a conventional design, may be surrounded by one of my toroidal non-magnetic mutual-reactance devices, in place of the customary iron-core current-transformer.

As shown in Fig. 11, my toroidal non-magnetic mutual-reactance device comprises a wooden toroid or closed ring 112 which is wound with a coil 111 of insulated wire, the wires having close spacing, so as to be touching each other on the inner periphery of the ring 112. The wooden ring is formed in two halves 112a and 112b so as to enable the return-conductor 118 of the coil 111 to be brought back through the center of the toroid. Otherwise, the construction of my non-magnetic mutual-impedance device will be readily understood from the description already given in connection with Fig. 3.

While I have illustrated my invention in several different forms of embodiment, including forms at present preferred by me, it is obvious that many changes in the details of the design may be adopted by those skilled in the art without departing from the essential spirit of my invention, at least in the broader aspects thereof. I desire, therefore, that the appended claims shall be accorded the broadest construction consistent with their language and the prior art.

I claim as my invention:

1. A commercially practicable device for utilizing a voltage-responsive means in obtaining a current-response from a multi-terminal alternating-current power-apparatus of a commercial power-line frequency, comprising a current-responsive mutual-inductance coupling device associated with each of the plurality of terminals, each coupling device producing a measurable internal-voltage response which is at all times substantially linearly responsive to the rate of change of current flowing into or out of the apparatus at that terminal, the mutual-impedance branch of the equivalent diagram of each coupling device having a substantially linear volt-ampere characteristic for all current-values therein within the operating range of the device, each coupling device having a self-contained, substantially astatic magnetic circuit which is substantially unaffected either by neighboring members of magnetic material or by any flux other than that which results from the current flowing in the associated power-line conductor, summation means for deriving a measurable voltage which is responsive to the instantaneous sum of the several coupling-device responses, integrated over the operating-time of the voltage-responsive means, and means for causing said voltage-responsive means to be energized responsively to said sum.

2. A commercially practicable device for utilizing a voltage-responsive means in obtaining a current-response from a multi-terminal alternating-current power-apparatus of a commercial power-line frequency, comprising a current-responsive mutual-inductance coupling device associated with each of the plurality of terminals, each coupling device producing a measurable internal-voltage response which is at all times substantially linearly responsive to the rate of change of current flowing into or out of the apparatus at that terminal, the mutual-impedance branch of the equivalent diagram of each coupling device having a substantially linear volt-ampere characteristic for all current-values therein up to the maximum primary current, each coupling device having a self-contained, substantially astatic magnetic circuit which is substantially unaffected either by neighboring members of magnetic material or by any flux other than that which results from the current flowing in the associated power-line conductor, summation means for deriving a measurable voltage which is responsive to the instantaneous sum of the several coupling-device responses, integrated over the operating-time of the voltage-responsive means, and means for causing said voltage-responsive means to be energized responsively to said sum.

3. A commercially practicable device for utilizing a voltage-responsive means in obtaining a current-response from a multi-terminal alternating-current power-apparatus of a commercial power-line frequency, comprising a current-responsive mutual-inductance coupling device associated with each of the plurality of terminals, each coupling device comprising a core of substantially constant permeability under all of the operating conditions of the device, said power-line conductor being arranged to constitute a primary-winding circuit in magnetizing relation to said core, said coupling device further comprising a secondary-winding circuit in current-inducing relation to said core, whereby said substantially constant permeability causes said coupling device to produce a measurable internal-voltage response, at all times substantially linearly responsive to the rate of change of current flowing in said power-line conductor, the core of each coupling device being a self-contained, substantially astatic magnetic circuit which is substantially unaffected either by neighboring members of magnetic material or by any flux other than that which results from the current flowing in the associated power-line conductor, summation means for deriving a measurable voltage which is responsive to the instantaneous sum of the several coupling-device responses, integrated over the operating-time of the voltage-responsive means, and means for causing said voltage-responsive means to be energized responsively to said sum.

4. A commercially practicable device for obtaining a current-response in a multi-terminal alternating-current electrical power-apparatus of a commercial power-line frequency, comprising a current-responsive coupling device associated with each of the plurality of terminals, each coupling device being a mutual-impedance device comprising a closed-ring core of non-magnetic material substantially enclosed within a large number of closely disposed turns of a coil, the terminal conductor of said electrical apparatus being linked through said closed-ring core, summation means for deriving a measurable voltage which is responsive to the sum of the several coupling-device responses, and voltage-responsive means responsive to said sum.

5. A commercially practicable device for obtaining a current-response in a multi-terminal alternating-current electrical power-apparatus of a commercial power-line frequency, comprising a current-responsive coupling device associated with each of the plurality of terminals, each coupling device being a mutual-impedance device comprising a closed-ring core of substantially constant permeability under all of the operating conditions of the device, a coil having a plurality of turns around said closed-ring core, the terminal conductor of said electrical apparatus being linked through said closed-ring core, summation means for deriving a measurable voltage which is responsive to the sum of the several coupling-device responses, and voltage-responsive means responsive to said sum.

6. The invention as defined in claim 4, characterized by said coil being wound on said closed-ring core in such maner as to have substantially zero mutual inductance with reference to any circuit not passing through said core, independently of the number of closely disposed turns of said coil.

7. The invention as defined in claim 4, characterized by said coil being wound in a single layer once around said closed-ring core and having one turn of the conductor extending centrally through said core, with current flowing in said one-turn conductor in the reverse direction around the core so as to make the coupling device astatic.

8. A commercially practicable device for utilizing a voltage-responsive means in obtaining a current-response from a commercial power-line, comprising a current-responsive mutual-inductance coupling device associated with a power-line conductor, said coupling device producing a measurable internal-voltage response, at all times substantially linearly responsive to the rate of change of current flowing in said power-line conductor, the mutual-impedance branch of the equivalent diagram of said coupling device having a substantially linear volt-ampere characteristic for all current-values therein within the operating range of the device, said coupling device having a self-contained, substantially astatic magnetic circuit which is substantially unaffected either by neighboring members of magnetic material or by any flux other than that which results from the current flowing in the associated power-line conductor, and means for causing said voltage-responsive means to be energized, at least in part, responsively to said measurable internal-voltage response of the coupling device.

9. A commercially practicable device for utilizing a voltage-responsive means in obtaining a current-response from a commercial power-line, comprising a current-responsive mutual-inductance coupling device associated with a power-line conductor, said coupling device producing a measurable internal-voltage response, at all times substantially linearly responsive to the rate of change of current flowing in said power-line conductor, the mutual-impedance branch of the equivalent diagram of said coupling device having a substantially linear volt-ampere characteristic for all current-values therein up to the maximum primary current, said coupling device having a self-contained, substantially astatic magnetic circuit which is substantially unaffected either by neighboring members of magnetic material or by any flux other than that which results from the current flowing in the associated power-line conductor, and means for causing said voltage-responsive means to be energized, at least in part, responsively to said measurable internal-voltage response of the coupling device.

10. A commercially practicable device for utilizing a voltage-responsive means in obtaining a current-response from a commercial power-line comprising a current-responsive mutual-inductance coupling device associated with a power-line conductor, said coupling device comprising a core of substantially constant permeability under all of the operating conditions of the device, said power-line conductor being arranged to constitute a primary-winding circuit in magnetizing relation to said core, said coupling device further comprising a secondary-winding circuit in current-inducing relation to said core, whereby said substantially constant permeability causes said coupling device to produce a measurable internal-voltage response, at all times substantially linearly responsive to the rate of change of current flowing in said power-line conductor, said core being a self-contained, substantially astatic magnetic circuit which is substantially unaffected either by neighboring members of magnetic material or by any flux other than that which results from the current flowing in the associated power-line conductor, and means for causing said voltage-responsive means to be energized, at least in part, responsively to said measurable internal-voltage response of the coupling device.

11. A commercially practicable device for utilizing a voltage-responsive means in obtaining a current-response from a commercial power-line, comprising a current-responsive mutual-inductance coupling device associated with a power-line conductor, said coupling device comprising a closed-ring core of non-magnetic material substantially enclosed within a large number of closely disposed turns of a coil, said power-line conductor being linked through said closed-ring core, whereby the non-magnetic material of said core causes said coupling device to produce a measurable internal-voltage response, at all times substantially linearly responsive to the rate of change of current flowing in said power-line conductor, and means for causing said voltage-responsive means to be energized, at least in part, responsively to said measurable internal-voltage response of the coupling device.

12. A commercially practicable device for utilizing a votage-responsive means in obtaining a current-response from a commercial power-line, comprising a current-responsive mutual-inductance coupling device associated with a power-line conductor, said coupling device comprising a closed-ring core of substantially constant permeability under all of the operating conditions of the device, a coil having a plurality of turns around said closed-ring core, said power-line conductor being linked through said closed-ring core, whereby said substantially constant permeability causes said coupling device to produce a measurable internal-voltage response, at all times substantially linearly responsive to the rate of change of current flowing in said power-line conductor, and means for causing said voltage-responsive means to be energized, at least in part, responsively to said measurable internal-voltage response of the coupling device.

13. The invention as defined in claim 11, characterized by said coil being wound on said closed-ring core in such manner as to have substantially zero mutual inductance with reference to any circuit not passing through said core, independently of the number of closely disposed turns of said coil.

14. The invention as defined in claim 11, characterized by said coil being wound in a single layer once around said closed-ring core and having one turn of the conductor extending centrally through said core, with current flowing in said one-turn conductor in the reverse direction around the core so as to make the coupling device astatic.

15. Phase-sequence equipment for obtaining a predetermined kind of phase-sequence response from a system of polyphase voltages, comprising a current-responsive sequence-network, and circuit-means for energizing the respective phases of the current-responsive sequence-network from the corresponding phases of said voltages in combination with such external loading impedances, in addition to said current-responsive sequence-network, as shall substantially equalize the loads and power factors of the devices connected to each of said voltages.

16. Phase-sequence equipment for obtaining a predetermined kind of phase-sequence response from a system of polyphase voltages, comprising a current-responsive sequence-network, voltage-responsive means energized from said current-responsive sequence-network, said voltage-responsive means drawing a very small current with respect to the total current drawn by the relaying equipment from each of said polyphase voltages, and circuit-means for energizing the respective phases of the current-responsive sequence-network from the corresponding phases of said voltages in series with such external loading impedances, in addition to said current-responsive sequence-network, as shall substantially equalize the loads and power factors of the devices connected to each of said voltages.

17. Phase-sequence equipment for obtaining a predetermined kind of phase-sequence response from a system of polyphase voltages, comprising a plurality of serially connected impedances loading each of said polyphase voltages, some of said impedances in each series being different in phase and magnitude from others, the serially connected impedances in each phase of said system of polyphase voltages being the same as in any other phase, and a plurality of similar series of sequence-selective impedance-drop circuits, each utilizing a different phase of said polyphase voltages as the principal phase of reference, each impedance-drop circuit including a selected portion of only some of the impedances in a plurality of phases, said selected portions being not all of the same phase-angle or magnitude, and substantially equivalent load-devices for completing each of said selective impedance-drop circuits, at least one of said load-devices being a voltage-responsive device.

18. A composite phase-sequence network responsive to the three current-phases in a three-phase system of vectors, said network comprising three similar sets of serially connected impedances, the impedances of any set being not all of the same phase-angle; means for causing each of the several sets of impedances to be traversed, in effect, by one of the three current-phase, respectively; three network measuring-circuits each including means for, in effect, adding the voltage-drop in a first predetermined kind of impedance in one current-phase, the voltage-drop in a second predetermined kind of impedance in the next lagging current-phase, and the voltage-drop in a third predetermined kind of impedance in the third current-phase, at least one of said three predetermined kinds of impedances being different from the other kinds; and three loading-devices, of similar loading-impedances, for the three measuring-circuits, respectively.

19. A composite phase-sequence network responsive to the three current-phases and the neutral current in a three-phase system of vectors, said network comprising three similar sets of serially connected impedances, the impedances of any set being not all of the same phase-angle; means for causing each of the several sets of impedances to be traversed, in effect by one of the three current-phases, respectively; a neutral-current network-impedance circuit, means for causing the neutral-current impedance to be traversed, in effect, by the neutral current; three network measuring-circuits each including means for, in effect, adding the voltage-drop in a first predetermined kind of impedance in one current-phase, the voltage-drop in a second predetermined kind of impedance in the next lagging current-phase, the voltage-drop in a third predetermined kind of impedance in the third current-phase, and the voltage-drop in a neutral current impedance, at least one of said three predetermined kinds of impedances being different from the other kinds; and three loading-devices, of similar loading impedances, for the three measuring-circuits, respectively.

20. The invention as defined in claim 18, characterized by each of said loading-devices being a relay, and means whereby a response of any one of said relays effects a controlling change in a responsive relaying circuit.

21. The invention as defined in claim 19, characterized by each of said loading-devices being a relay, and means whereby a response of any one of said relays effects a controlling change in a responsive relaying circuit.

22. The invention as defined in claim 19, characterized by said summation means comprising a series-circuit means for connecting the output circuits of the several coupling devices in series-circuit relation with each other and with said voltage-responsive means.

23. The invention as defined in claim 2, characterized by said summation means comprising a series-circuit means for connecting the output circuits of the several coupling devices in series-circuit relation with each other and with said voltage-responsive means.

24. The invention as defined in claim 3, characterized by said summation means comprising a series-circuit means for connecting the output circuits of the several coupling devices in series-circuit relation with each other and with said voltage-responsive means.

25. The invention as defined in claim 4, characterized by said summation means comprising a series-circuit means for connecting the output circuits of the several coupling devices in series-circuit relation with each other and with said voltage-responsive means.

26. The invention as defined in claim 5, characterized by said summation means comprising a series-circuit means for connecting the output circuits of the several coupling devices in series-circuit relation with each other and with said voltage-responsive means.

EDWIN L. HARDER.